US012795462B2

(12) United States Patent
Qian et al.

(10) Patent No.: US 12,795,462 B2
(45) Date of Patent: Nov. 10, 2026

(54) STREAMLINING MOBILITY BETWEEN DIFFERENT G-NETWORKS

(71) Applicant: Microsoft Technology Licensing, LLC, Redmond, WA (US)

(72) Inventors: Haibo Qian, Frisco, TX (US); Fred Rink, Fairview, TX (US); Michael Brown, McKinney, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 506 days.

(21) Appl. No.: 18/203,494

(22) Filed: May 30, 2023

(65) Prior Publication Data

US 2024/0284268 A1 Aug. 22, 2024

Related U.S. Application Data

(60) Provisional application No. 63/446,730, filed on Feb. 17, 2023.

(51) Int. Cl.
*H04W 36/00* (2009.01)
*H04W 36/14* (2009.01)

(52) U.S. Cl.
CPC ...... *H04W 36/00222* (2023.05); *H04W 36/14* (2013.01)

(58) Field of Classification Search
CPC ........................ H04W 36/00222; H04W 36/14
USPC .................................. 370/331; 455/436–444
See application file for complete search history.

(56) References Cited

U.S. PATENT DOCUMENTS

| | | | | |
|---|---|---|---|---|
| 6,112,249 | A | 8/2000 | Bader | |
| 10,084,731 | B2 | 9/2018 | Keating | |
| 2020/0053828 | A1 | 2/2020 | Bharatia et al. | |
| 2020/0068449 | A1* | 2/2020 | Jin | H04W 36/0016 |
| 2020/0329420 | A1* | 10/2020 | Ishikawa | H04W 88/16 |
| 2021/0092657 | A1 | 3/2021 | Kanagarathinam | |
| 2021/0282058 | A1* | 9/2021 | Jin | H04W 36/0011 |

OTHER PUBLICATIONS

International Preliminary Report on Patentability (Chapter I) received for PCT Application No. PCT/US2024/016059, Aug. 28, 2025, 08 pages.

(Continued)

*Primary Examiner* — Michael Y Mapa

(57) ABSTRACT

Aspects of the present disclosure relate to maintaining a network connection while moving from location to location as between different technologies such as from the 2G/3G to the 5G standard, and vice versa. A mobility management entity (MME), e.g., on a 4G platform, controls the transfers of sessions from the 4G platform to the 2G/3G platform when the and/or from the 4G platform to the 5G platform. The MME classifies different sessions on the UE as anchored in GGSN, PGW or SMF. When needed, the MME is then able to transfer the sessions that are transferrable and to terminate the ones that cannot be transferred. By terminating the ones that cannot be transferred, the device can begin reestablishing the connection without waiting, e.g., without waiting for the timeout failure to occur.

20 Claims, 9 Drawing Sheets

(56) References Cited

OTHER PUBLICATIONS

InterDigital LLC: "Default PDP context after inter-system change with only LIPA PDN Connection," 3GPP Draft; C1-111068, 3rd Generation Partnership Project (3GPP), Mobile Competence Centre; 650, Route Des Lucioles; F-06921 Sophia-Antipolis Cedex; France, vol. CT WG1, Issue no. Salt Lake City, Feb. 21, 2011, Feb. 14, 2011, 3pages.
International Search Report and Written Opinion received for PCT Application No. PCT/US2024/016059, Jun. 20, 2024, 14 pages.
Communication under Rule 71(3) received for European Application No. 24713254.1, mailed on Jun. 19, 2026, 07 Pages.
Communication under Rule 71(3) received for European Application No. 24713254.1, mailed on Aug. 27, 2026, 8 Pages.

* cited by examiner

4G→2G/3G in idle mode

4G→2G/3G in connected mode

4G→5G in idle mode

4G → 5G in connected mode

STREAMLINING MOBILITY BETWEEN DIFFERENT G-NETWORKS

CROSS-REFERENCE TO RELATED APPLICATION

This application claims priority to U.S. Provisional Application No. 63/446,730, titled "Streamlining Mobility between Different G-Networks," filed on Feb. 17, 2023, the entire disclosure of which is hereby incorporated by reference in its entirety.

BACKGROUND

Mobile computer devices, such as mobile phones, are more prevalent than ever. Maintaining a network connection while moving from location to location is an ongoing challenge given the different technologies used in various platforms at different geographical locations. For instance, some platforms use the 2G/3G standard, others use the 4G standard and still others are using only the 5G standard. When 4G was introduced, technology, protocols and standards were developed to smoothly transition between 2G/3G platforms and 4G platforms as users moved from one location to another. Consequently, users moving from an area supported only by legacy 2G/3G technology could transfer smoothly, without dropping packets or requiring reconnection when moving to areas that supported 4G technology and back. Similarly, as 5G platforms were developed, specific technology, protocols and standards were developed to move users between 4G platforms and 5G platforms. Consequently, users moving to and from areas supported by 5G technology to those with 4G technology can transfer connections relatively smoothly.

However, when moving from 2G/3G technology to or from 5G technology directly, the standard requires the device to re-establish the connection or session. That said however, sometimes devices will move from 2G/3G platforms to 5G platforms by way of a 4G platform. Given the generally smooth transitions between 2G/3G and 4G, and likewise between 4G and 5G, the system will do its best when moving a session originating in 2G/3G to 5G through 4G to make the connection without causing a re-connection requirement. When doing so however, given the ultimate requirement for re-connection, sessions fail for time-out issues as the sessions may not be known in the target system. This sometimes takes many minutes to reconnect. Given that 2G/3G technology continues to be persistently used, and given that 5G is gaining in prevalence, such transition failures are more common and problematic.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to maintaining a network connection while moving from location to location as between different technologies such as from the 2G/3G to the 5G standard, and vice versa. Embodiments described herein relate to establishing an "any-G" network, where "any-G" involves the support and transfer of sessions between any of the 2G/3G, 4G and 5G platforms. More specifically, embodiments described herein relate to the movement of a user across the platforms and moving to or from 2G/3G form or to 5G by way of a 4G platform to allow for relatively seamless transitions, avoiding the time-out failures, as discussed below.

When certain connections are established by a user device, or user equipment to a mobility management entity (MME), e.g., on a 4G platform, the MME may communicate with the different platforms through different gateways. The MME controls the transfers of sessions from the 4G platform to the 2G/3G platform and/or from the 4G platform to the 5G platform. The MME, in embodiments described herein, is enhanced beyond the standard to smooth the transition of sessions from the 2G/3G platform to the 5G platform and vice versa through the 4G platform. The MME classifies the different sessions on the UE as anchored in GGSN, PGW or SMF. In this manner, the MME is able, when needed, to transfer the sessions that are transferrable and to terminate the ones that cannot be transferred. By terminating the ones that cannot be transferred, the device can begin reestablishing the connection without waiting, e.g., without waiting for the timeout failure to occur.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Reference will now be made to the accompanying drawings, which are not necessarily drawn to scale, and wherein.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

When a user travels between a 2G/3G network and a 5G network via a 4G network, if the mobility management entity (MME) does not know the type of gateways that are used by user equipment, the MME will try to transfer the sessions to a gateway that cannot handle the session. Moreover, existing MMEs generally do not track information related to the session anchor point's ability with regard to supporting sessions from all radio technologies. Consequently, when a user moves from one location to another and wants to transfer connectivity from 2G/3G to 5G or vice versa, equipment used by the user, i.e., the user equipment (UE), is expected to initiate an initial/new registration with the new network. When a UE travels between 2G/3G and 4G coverage, such session transfer is supported, as is mobility between 4G and 5G. However, sessions initially anchored in 2G/3G may not be transferred seamlessly to 5G. Similarly, sessions initially anchored in 5G may not be seamlessly transferred to 2G/3G. Instead, these sessions must be re-established. As a result, some sessions may be transferred, and others may not. For example, if a session is created on a GGSN/PGW node, which correlates to a node supporting 2G/3G and 4G, and the UE moves to AMF, which is related to a node supporting 5G, then the MME will attempt to transfer the session to the 5G side. However, since the initial gateway was not an SMF gateway, the transfer would eventually fail after a delay, impacting the user experience. In essence, prior systems would assume all sessions can and will be transferred and will send a success indicator back to the source. However, as stated, not all sessions are successfully transferred and therefore time-out failures occur for those specific sessions.

Embodiments described herein relate to establishing an "any-G" network, where "any-G" involves the support and transfer of sessions between any of the 2G/3G, 4G and 5G platforms. More specifically, embodiments described herein relate to the movement of a UE across the platforms and moving to or from 2G/3G form or to 5G by way of a 4G platform to allow for relatively seamless transitions, avoiding the time-out failures, as discussed below.

Figure 1:
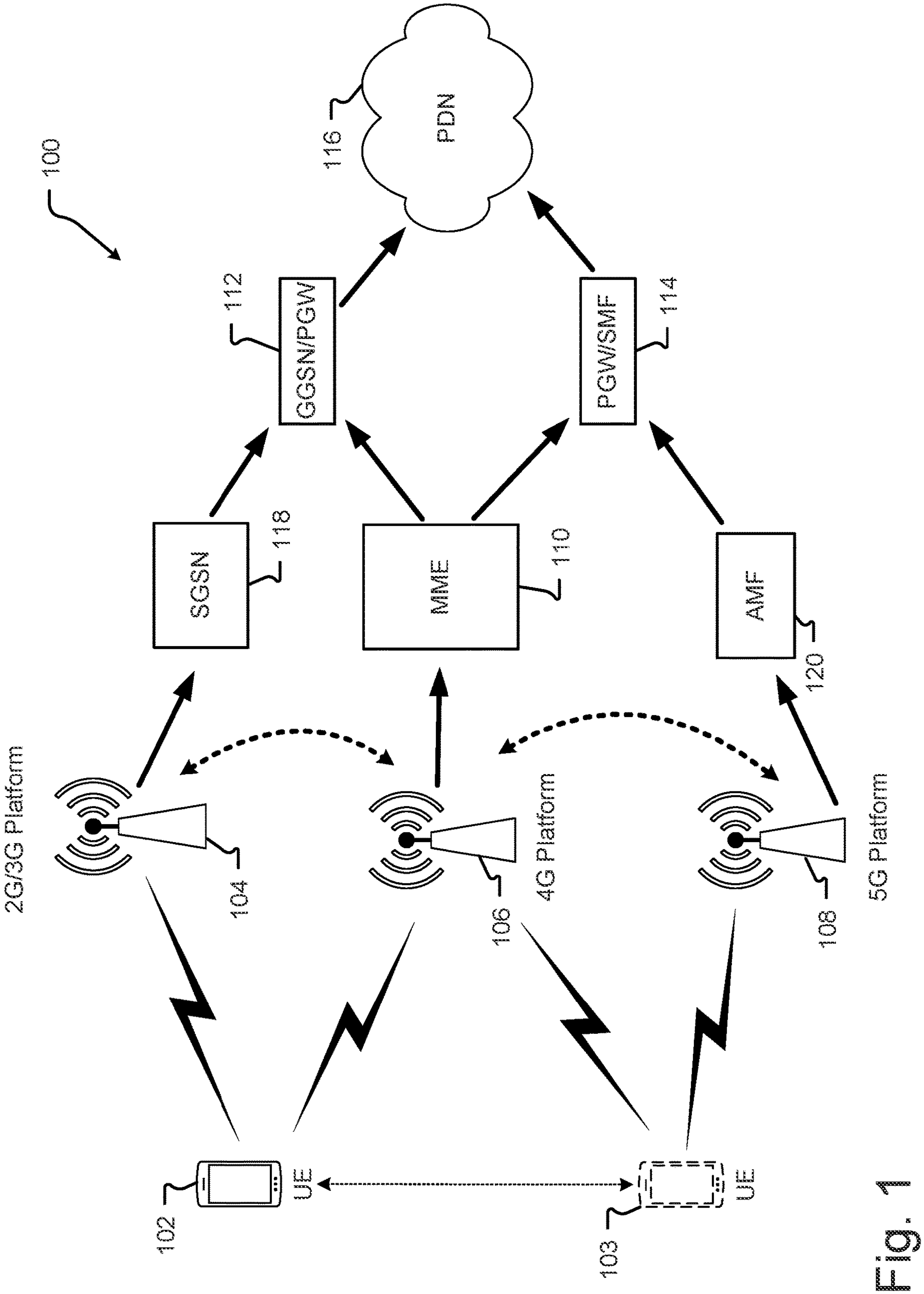
FIG. 1 illustrates an exemplary, non-limiting embodiment of a high-level system and environment in accordance with various aspects described herein.

FIG. 1 illustrates an environment 100 for implementing embodiments of the present innovation. The environment 100 comprises a user device 102, also referred to as user equipment 102 or just UE 102. The UE 102 relates to a mobile computing device such as a mobile phone, a laptop computer system, a connected car, or the like. One skilled in the art will appreciate the different types of UE 102 that may benefit from the innovations described herein. As shown, the UE 102 may physically move to or from a second location, such as shown by UE 103. UE 103 is in dashed lines to indicate movement to that second location.

As shown in FIG. 1, UE 102 may originally connect to a 2G/3G platform 104. Those skilled in the art will understand how such connectivity may be established through an RNC or the like. Also, as will be appreciated when connected to the 2G/3G platform, sessions may be anchored in the GGSN technology. As shown, the UE 102 may, either initially or following movement, connect to 4G platform 106. It is possible that the UE 102 may move from 2G/3G 104 to 4G platform 106.

According to aspects of embodiments herein, the UE 102 may move to a new geographic location (such movement is depicted by UE 103 in FIG. 1) and connect to 5G platform 108. As shown, such movement may cause session transfers of user data sessions from 2G/3G platform 104 to 5G platform 108 by way of 4G platform 106.

As shown, when certain connections are established by the UE 102 or UE 103 through 106, the system includes a backend mobility management entity (MME) 110. As is known, the MME 110 is a network component for cellular networks, especially for 4G platforms, responsible for managing mobility related functions such as tracking of the location of the devices and managing handovers between calls. In the simplified FIG. 1, the MME may communicate with the different platforms, by way of SGSN 118 to reach 2G/3G platform 104, and AMF 120 to reach platform 108, and communicates through GGSN/PGW node 112 or PGW/SMF 114 to route packets to and from other networks such as the Public Data Network (PDN) 116 and/or other devices, not shown. Similarly, the 2G/3G platform 104 may communicate with SGSN node 118 to route packets through GGSN/PGW 112. Also, 5G platform 108 may communicate with AMF node 120 to route packets through PGW/SMF node 114.

The MME 110, in embodiments, controls the transfers of sessions from the 4G platform 106 to the 2G/3G platform 104 when the UE 102 transfers into a 2G/3G platform 104 area. Further, the MME 110 can control the transfer of sessions from the 4G platform 106 to the 5G platform 108 when the UE 102 transfers into a 5G platform 108 area. As is known, in order to support 2G/3G and 4G mobility, the combined GGSN/PGW node/gateway 112 may be used. As a result, some of the 2G/3G sessions may be anchored in GGSN or in PGW. In order to support 4G to 5G mobility, combined PGW/SMF node/gateway 114 may be used. As a result, some of the 5G sessions may be anchored in SMF or in PGW. These nodes and gateways are described in the 3GPP standard. It shall be noted that there can be a gateway that is a combined GGSN/PGW/SMF. If a session is anchored on such a gateway, the session can be transferred to 2G/3G, 4G and 5G platform. The method detailed in this disclosure covers such a scenario.

The MME 110, in embodiments described herein, is enhanced beyond the standard to smooth the transition of sessions from the 2G/3G platform 104 to the 5G platform 108 and vice versa. The MME 110, in embodiments, classifies the different sessions on the UE as anchored in GGSN, PGW or SMF. In this manner, the MME is able, when needed to transfer the sessions that are transferrable and to terminate the ones that cannot be transferred. By terminating the ones that cannot be transferred, the device can begin reestablishing the connection without waiting, e.g., without waiting for the timeout failure to occur.

Figure 2:
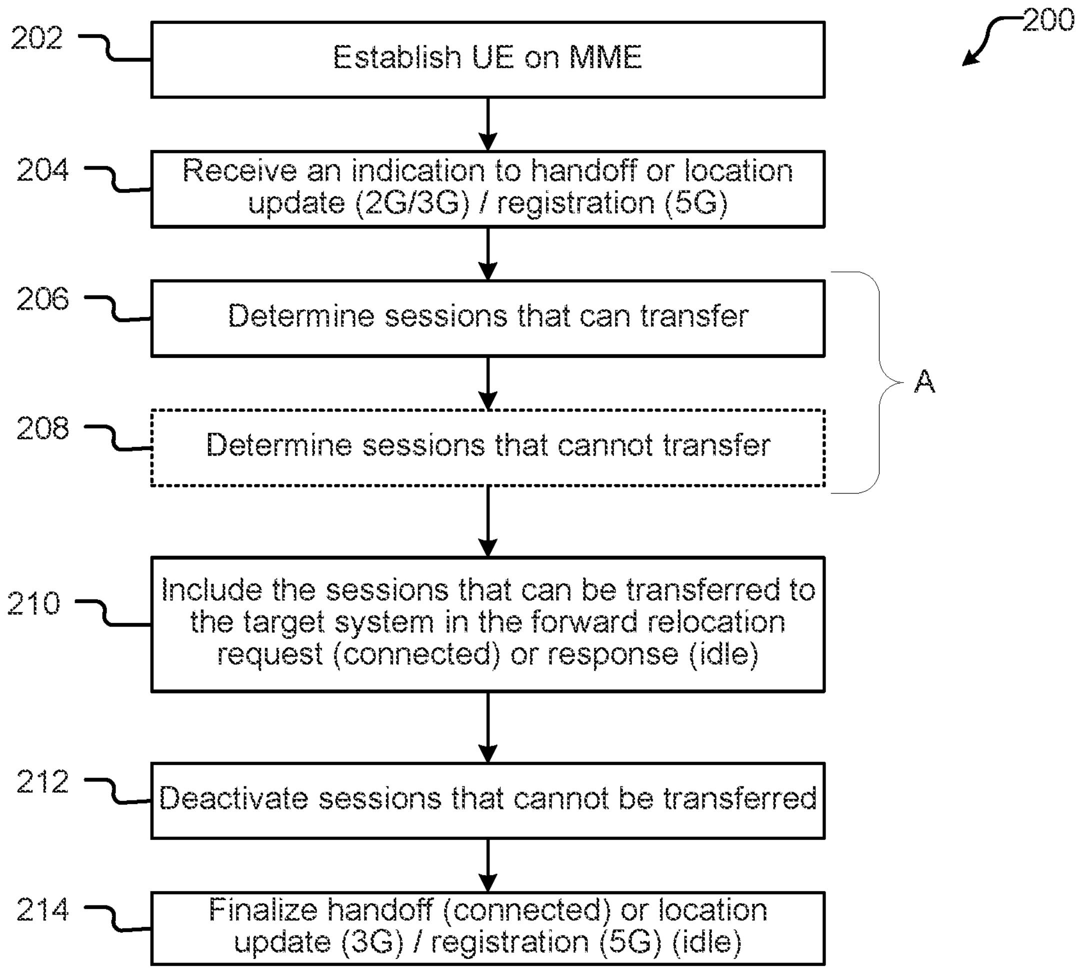
FIG. 2 depicts an illustrative embodiment of a method related to transferring control from one platform to another having a different platform technology in accordance with various aspects described herein.

FIG. 2 depicts an illustrative embodiment of a method 200 related to transferring control from one platform to another having a different platform technology in accordance with various aspects described herein. A general order of the operations for the method 200 is shown in FIG. 2. While a number of operations are shown, the method 200 may include more or fewer steps or may arrange the order of the steps differently than those shown in FIG. 2. The method 200 can be executed as computer-executable instructions executed by a computer system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with other figures described herein.

Method 200 generally begins with establish operation 202 where the UE is established on the MME. Those skilled in the art will appreciate how to establish a UE on an MME to handle mobility for that device.

Next, receive operation 204 receives an indication to transfer or initiate a handoff from one platform to another. Receive operation 204 is known to those skilled in the art and can be initiated by the device or by an intermediate network component recognizing the need to handoff the UE to another node or network. Such event occurs when the UE is moving from one location to another, which is covered by a different network platform as shown in FIG. 1. A handoff request is received when the device is in active or connected mode, e.g., when the UE device is actively being used, such as during a phone call and/or when an application on the device is sending/receiving data packets. Otherwise, the UE is considered to be in idle mode, and thus the receive operation 204 receives a transfer of control request, such as through a location update signal or a registration request. The location update signal occurs when the device moves into a 2G/3G platform area. A registration request occurs when the device moves into a 5G platform area.

Once an indication to transfer control or handoff the sessions has been received, determine operation 206 determines the different active sessions that can be transferred. In essence, when a device is connected to a network, different sessions may be established within the network, each one having different communication processes that may be occurring, e.g., different applications may be actively communicating with the network using different session identifiers. The anchoring of each session occurs during the initial instantiation of the session. Determine operation 206 evaluates each session, and the anchor information for each session, to determine if it can be transferred to the new network or not. Hence, as shown, there is an alternative or additional determine step 208 that may determine the sessions that cannot be transferred. Both determine operations are discussed in more detail below in conjunction with FIG. 3.

Once the sessions that can, and/or cannot be transferred are identified, include operation 210 includes identifications of those sessions that can be transferred in a response to the transfer request. Such inclusion allows for the next process step to receive and continue the session without termination. More specifically, when in idle mode and transferring from a 4G platform area to a 2G/3G platform area, the session information related to sessions that can transfer will be included in the SGSN context response signal. Likewise, when in idle mode and transferring from a 4G platform area to a 5G platform area, the session information related to sessions that can transfer will be included in the context response to the registration request. Otherwise, when in connected mode and transferring from 4G platform area to either 2G/3G or 5G areas, then the session information related to sessions that can transfer will be included in the forward relocation request signal.

Next, or in parallel, deactivate operation 212 deactivates or terminates all sessions that cannot be transferred. By actively terminating the sessions, the UE is able to re-establish the connection for those sessions as would be required in direct transfer from 2G/3G to 5G in the past. In embodiments, the deactivation or termination of non-transferrable sessions occurs substantially simultaneously with the transfer of transferrable sessions. That is, the deactivation is performed actively without waiting for a timeout error.

Last, the handoff or transfer is finalized at finalize step 214.

Figure 3:
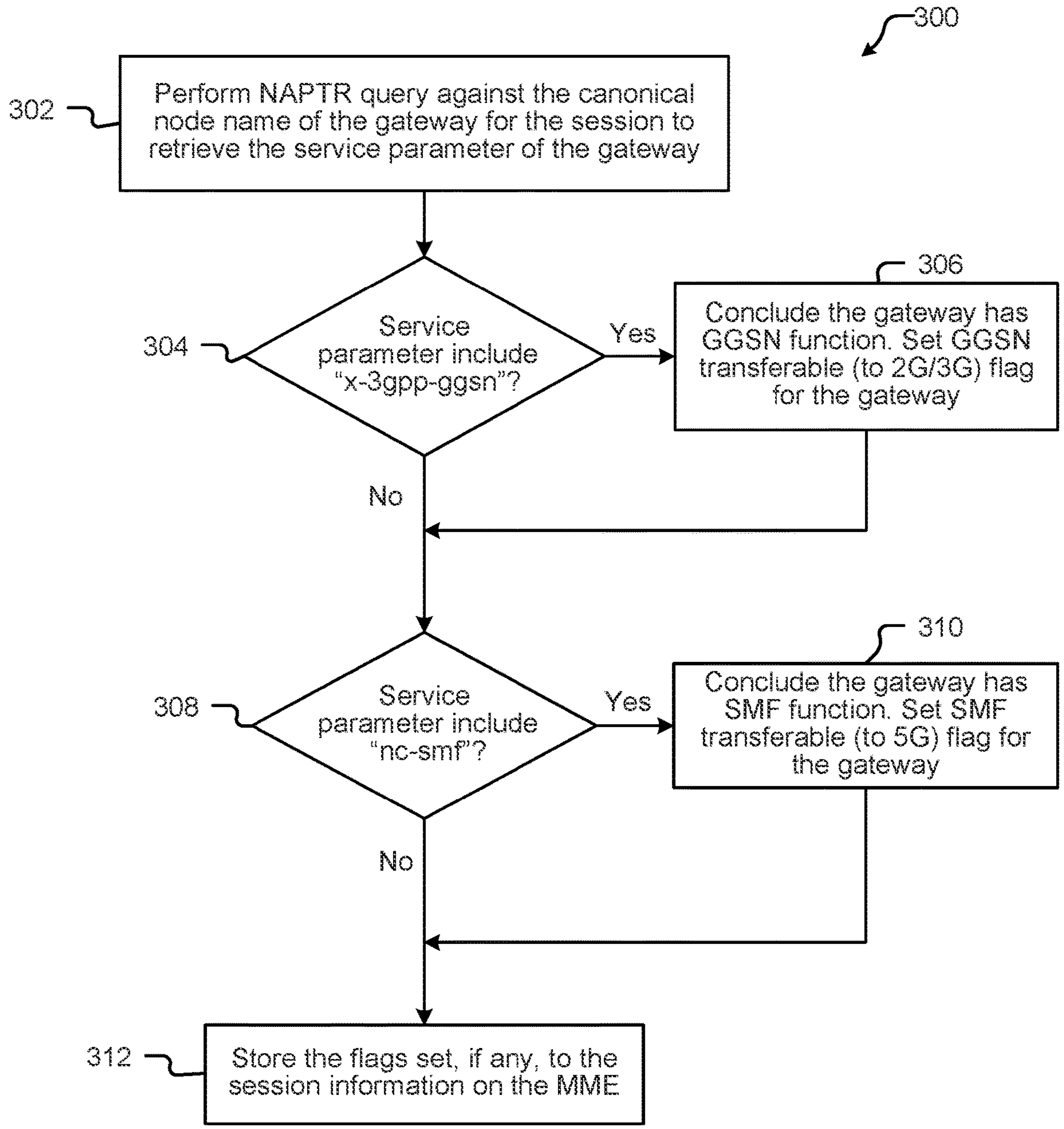
FIG. 3 depicts an illustrative embodiment of a method related to determining the capability of one or more gateways in accordance with various aspects described herein.

FIG. 3 depicts an illustrative embodiment of a method 300 related to determining whether different sessions can be transferred from one platform to another having a different platform technology in accordance with various aspects described herein. At a high level, method 300 relates to marking the sessions, within the MME according to the gateway such sessions were initially established, e.g., anchored. Such process may also be considered classifying the session. Using the classification, the method 200 discussed above is able to determine those sessions that can be transferred, e.g., at step 206 and/or those sessions that cannot be transferred at step 208.

Method 300 relates to one particular embodiment of classifying the different sessions. Method 300 begins with query operation 302 which queries against the canonical node name of the gateway to get the service parameter of the gateway. This process step, in embodiments, uses the NAPTR query to get such information. NAPTR stands for Name Authority Pointer type of resource record in the DNS or Domain Name System of the Internet. Those skilled in the art will appreciate the ability to implement a NAPTR query for the anchor gateway of each session to identify specific information relating to the gateway, to determine the capability of the gateway.

Next, at determine operation 304, the method 300 determines if the NAPTR response includes a service parameter having "x-3gpp-ggsn" in the response. If so, flow branches YES to conclude operation 306 to indicate that the session is GGSN transferable and therefore can be transferred to areas using the 2G/3G protocol. That is, 2G/3G the sessions may be anchored on GGSN (Gateway GPRS Support Node), e.g., such anchored sessions have the GGSN function capability. Conclude operation 306 may further mark or set the session as GGSN transferable to 2G/3G systems. Those skilled in the art may appreciate that there could be other queries and response indicators related to a session that could be used to conclude transferability to 2G/3G, the "x-3gpp-ggsn" is just one particular example.

Next, in an embodiment, flow passes to determine operation 308, after operation 304 and/or 306. Determine operation 308 determines if the NAPTR response includes a service parameter having "nc-smf" in the response. If so, flow branches YES to conclude operation 310 to indicate that the session was anchored using SMF (Session Management Function) and has the SMF function or capability, such as used in conjunction with the 5G protocol. Conclude operation 310 may also set or mark the session as SMF transferrable to 5G such that the session can transfer from 4G platform areas to a 5G platform area without terminating the session. Those skilled in the art may appreciate that there could be other queries and response indicators related to a session that could be used to conclude transferability to 5G, the "nc-smf" is just one particular example.

Next, store operation 312 stores any information related to session transferability to the MME. Consequently, when needed, the MME will be able to identify those sessions that are transferable and those that must be terminated. As shown, it may be that both determine operation 304 and determine operation 308 determine that a session may be marked as GGSN transferable and SMF transferable such that the session may be transferred gracefully to either 2G/3G or 5G platforms without termination and would be so marked. Also, it is possible that the session is not transferable gracefully, e.g., when it does not have either the "x-3gpp-ggsn" or the "nc-smf" service parameter. If so, then flow will pass to store operation 312 but nothing will be marked in that case. In summary, all four combinations of marking are possible after flow 300 shown in FIG. 3: transferrable to 2G/3G and 5G; transferrable to 2G/3G but not 5G; transferrable to 5G but not 2G/3G, transferrable to neither 2G/3G nor 5G. In the situation where a session is marked at transferable to 2G/3G and 5G, then the gateway has triple capability: GGSN/PGW/SMF. In the situation where a session is marked as transferrable to 2G/3G but not 5G, the gateway is GGSN/PGW. In the situation where a session is marked as transferrable to 5G but not 2G/3G, the gateway is PGW/SMF. In the situation where a session is marked as not transferrable to either 2G/3G or 5G, the gateway is a pure PGW and does not have GGSN or SMF capability at all. In this last case, the session can only stay on 4G platform, but this is not common.

As stated, store operation 312 essentially marks and/or stores session data for each session as transferrable to GGSN and/or transferrable to SMF depending on the capability of the gateway used for the session, if there is any such information. Alternatively, the capability of a gateway can be administratively defined on the MME. This is offered as an alternative to the DNS query, which uses the name of the gateway to get the NAPTR record to determine the capabilities. If the network operator does not prefer to use DNS, they can define the capability of each gateway via static configuration on the MME. For example, a gateway could be defined as PGW/GGSN or PGW/SMF or PGW or GGSN/PGW/SMF.

Figure 4:
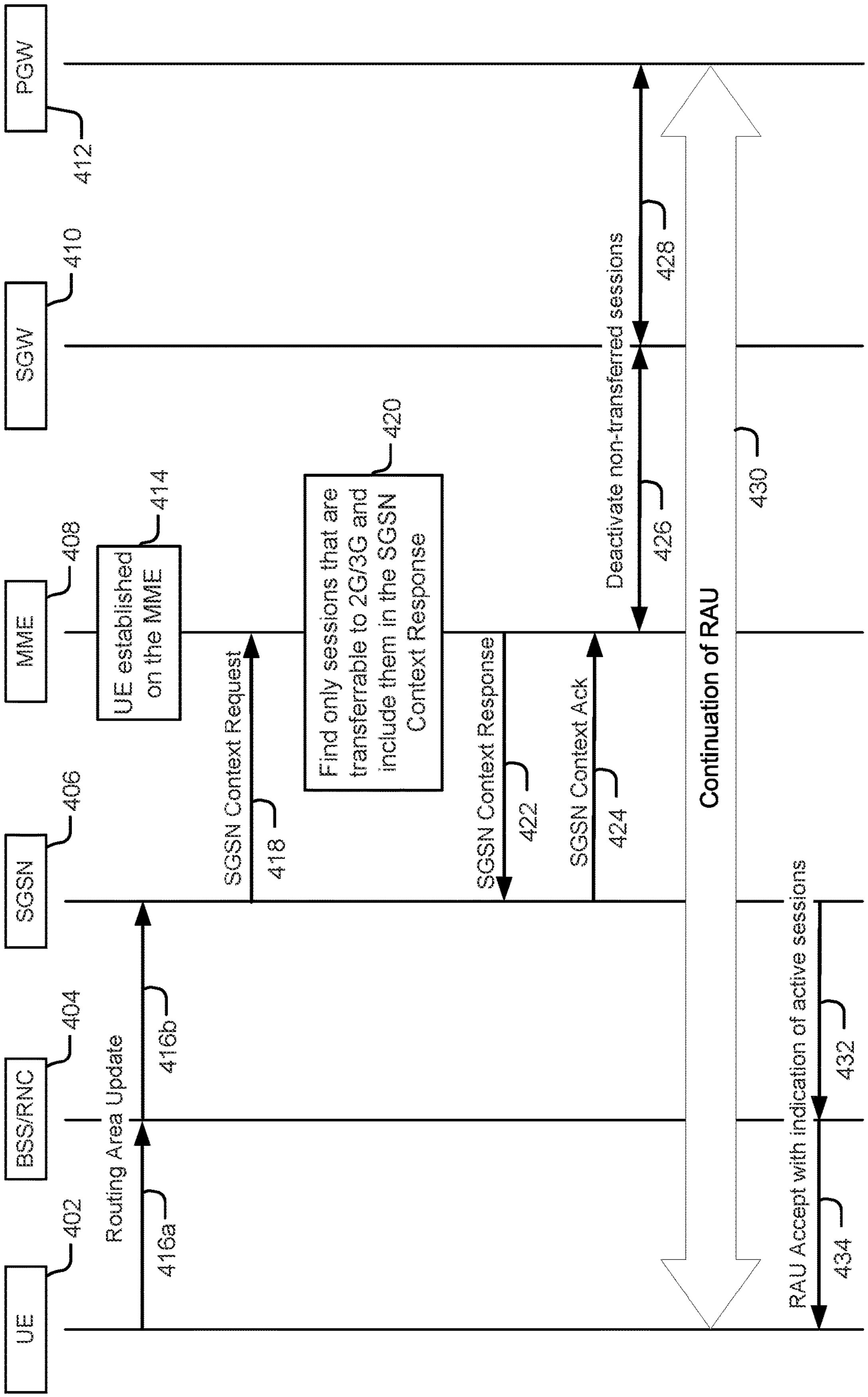
FIG. 4 illustrates timing diagram showing the transfer scenario from 4G to 2G/3G in the idle mode in accordance with various aspects described herein.

FIG. 4 illustrates a timing diagram as a UE 402 moves from one location, essentially connected to a 4G platform, to another location and needs to transfer to 2G/3G platform. FIG. 4 illustrates the control operations while in idle mode. A UE is considered to be in idle mode when not actively using the network for voice or data services but is still registered or connected to the network and can receive incoming calls or data sessions. When the device (UE 402) is in a 2G/3G platform area, then a Routing Area Update signal will be sent to the network. Those skilled in the art will appreciate the sending of such an update request as the device does so periodically to get information and/or to inform the network of its location.

As shown, the UE 402 communicates through the Base Station System or Radio Network Controller (BSS/RNC) 404 to the SGSN 406 (Serving GPRS Support Node). The SGSN communicates to the MME 408, which then communicates with the SGW 410, which in turn communicates with the PGW 412.

As an initial matter, the UE 402 is established/registered on the MME 408, as indicated by box 414, such that the MME 408 may control the mobility of the UE 402 and the transfer of connectivity between networks. Upon movement of the UE 402, a routing area update signal 416*a* is communicated to the BSS/RNC 404 which passes the signal 416*b* the SGSN 406. The routing area update (RAU) is commonly delivered to the BSS/RNC to inform the network about changes in location of the UE. Next, an SGSN context request signal 418 requests information from the MME 408, such as the device location or session information.

In response, the MME will create a response to the SGSN. Prior to responding to the SGSN however, the MME 408 evaluates the existing sessions for the UE and identifies those sessions that are transferrable to a 2G/3G platform as indicated by box 420. Identifying these sessions as transferrable may, in embodiments, relate to the method steps described above in conjunction with FIG. 3. In alternative embodiments, other methods may be used to identify the transferable sessions. For instance, it is contemplated that future sessions may include transferability information during setup such that the MME 408 can simply look at the setup information to determine transferability.

Next, the MME 408 will send the SGSN context response signal 422, which will include identification information for those sessions that can be transferred. It may not include session information for those that will not be transferred.

As is known, the SGSN will respond with an SGSN context ack signal 424. Next, MME 408 deactivates the sessions that cannot be transferred, e.g., by communicating deactivate signal 426 to the SGW 410. In turn, the SGW 410 will communicate a deactivate signal 428 to the PGW 412. The deactivate signals 426 and 428 will essentially deactivate or terminate any session that cannot be transferred, such as sessions anchored in SMF. Such termination allows the UE 402 to begin reestablishing those sessions as needed on the new platform.

Next, as will be appreciated by those skilled in the art, signals 430 continue the routing area update (RAU). Continuation of the RAU 430 occurs following the Context Ack signal step 424. While it is shown as happening after the deactivation process steps 426 and 428, it may occur before, after or in parallel with the deactivation process. Last the SGSN 406 communicates an acceptance of the update at 432 indicating the active sessions, which is communicated at 434 to the UE 402 by the BSS/RNC 404.

Figure 5:
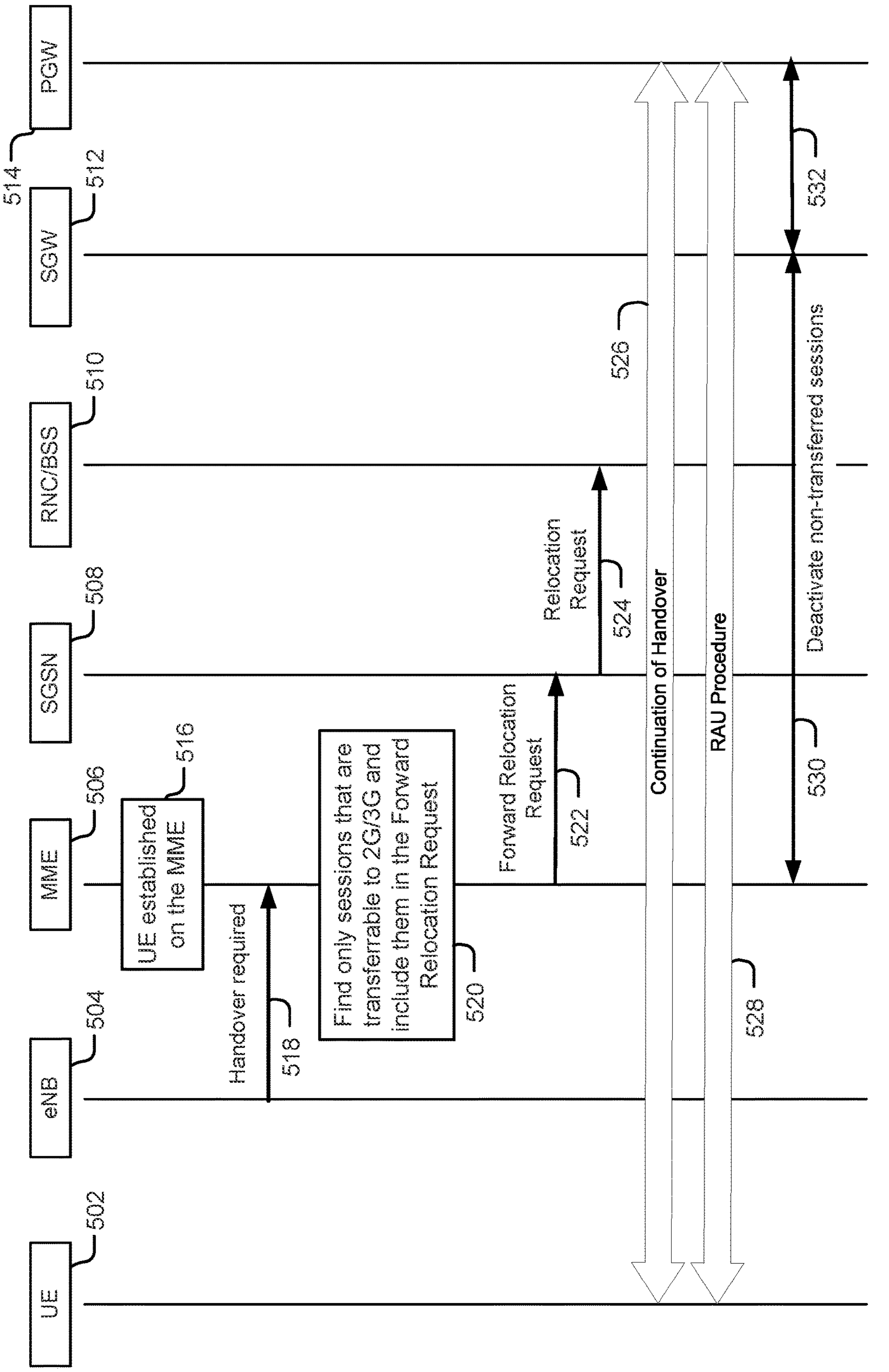
FIG. 5 illustrates timing diagram showing the transfer scenario from 4G to 2G/3G in the connected mode in accordance with various aspects described herein.

FIG. 5 illustrates a timing diagram as a UE 502 moves from one location, essentially connected to a 4G platform, to another location and needs to transfer to 2G/3G platform in the connected mode. In connected mode, the UE 502 is actively using the network for data and/or voices services and is exchanging data with the network. As will be appreciated by those skilled in the art, the UE 502, in connected mode, may communicate through an eNB 504 to MME 506. As discussed above, the MME 506 may communicate with a SGSN 508, which then communicates with a BSS/RNC 510, which can then communication with the SGW512 and the PGW 514.

Initially, the UE 502 is established/registered on the MME 506, as indicated by box 516, such that the MME 506 may control the mobility of the UE 502 and the transfer of connectivity between networks. Upon movement of the UE 502, a handover signal 518 is communicated from the eNB to the MME 506. Such a handover signal 518 is known and relates to the eNB sensing movement of the UE such that a handoff or handover is requested. Next, a forward relocation request is generated by the MME 506. However, prior to forwarding the relocation request, the MME 506 evaluates the existing sessions for the UE 502 and identifies those sessions that are transferrable to a 2G/3G platform as indicated by box 520. Identifying these sessions as transferrable may, in embodiments, relate to the method steps described above in conjunction with FIG. 2 or discussed above in conjunction with FIG. 3 and FIG. 4.

Next, the MME 506 forwards the relocation request signal 522 to the SGSN 508 which forwards to the RNC/BSS 510. The signals 522 and 524 will include identification information for those sessions that can be transferred. Such signals may not include session information for those that will not be transferred.

Next, as will be appreciated by those skilled in the art, signals 526 and 528 will continue the handoff or handover 526 and will continue to complete the RAU procedure 528.

At some point, following the transmission of the forward relocation request signal, MME 506 deactivates any sessions that cannot be transferred, e.g., by communicating deactivate signal 530 to the SGW 512. In turn, the SGW 512 will communicate a deactivate signal 532 to the PGW 514. The deactivate signals 530 and 532 will essentially deactivate or terminate any session that cannot be transferred, such as sessions anchored in SMF. Such termination allows the UE to begin reestablishing those sessions as needed on the new platform without further delay.

Figure 6:
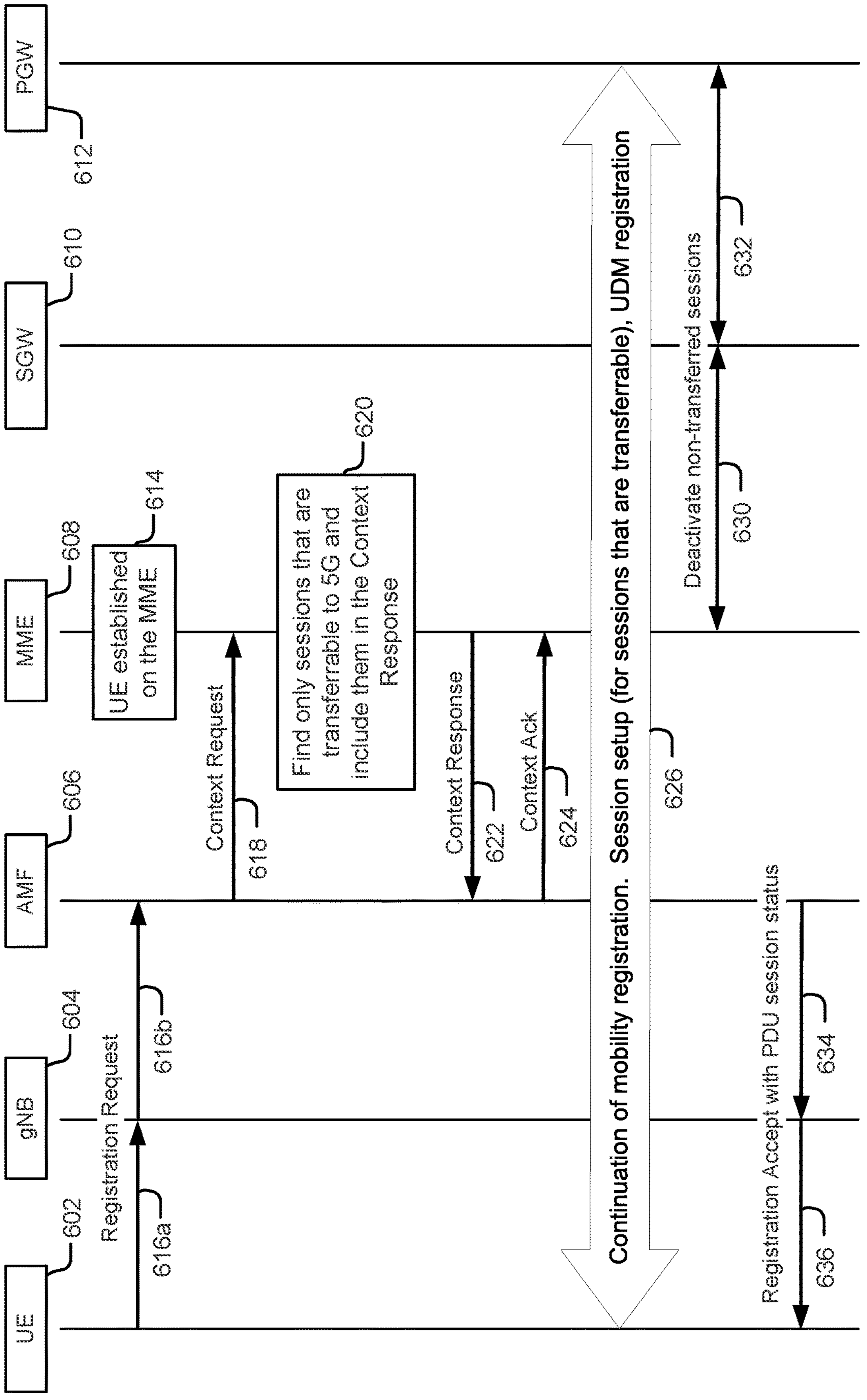
FIG. 6 illustrates timing diagram showing the transfer scenario from 4G to 5G in the idle mode in accordance with various aspects described herein.

FIG. 6 illustrates a timing diagram as a UE 602 has moved from one location, essentially connected to a 4G platform, to another location and needs to transfer to 5G platform according to another scenario contemplated herein. FIG. 6 illustrates the control operations while in idle mode. As discussed above, a UE is considered to be in idle mode when not actively using the network for voice or data services but is still registered or connected to the network and can receive incoming calls or data sessions. In this state, when the UE is in an area with 5G capability, then the UE will send a registration request, where the device is requesting information from the network.

As will be appreciated by those skilled in the art, the UE 602, in this scenario, communicates through the gNB 604 to the AMF 606. The AMF 606 communicates to the MME 608, which then communicates with the SGW 610, which in turn communicates with the PGW 612.

As an initial matter, the UE 602 is established/registered on the MME 608, as indicated by box 614, such that the MME 608 may control the mobility of the UE 602 and the transfer of connectivity between networks. Upon movement of the UE 602, a registration request **616*a* is communicated to the gNB 604 which passes the signal 616*b* to the AMF 606. The registration request is a known request to those skilled in the art. Next, a context request signal 618 requests information from the MME 608**, such as the device location or session information or other context information.

In response, the MME 608 will create a response to the AMF 606. Prior to responding to the AMF 606 however, the MME 608 evaluates the existing sessions for the UE 602 and identifies those sessions that are transferrable to a 5G platform as indicated by box 620. Identifying these sessions as transferrable may, in embodiments, relate to the method steps described above in conjunction with FIGS. 2, 3, 4 and 5.

Next, the MME 608 will send the context response signal 622, which will include identification information for those sessions that can be transferred. It may not include session information for those that will not be transferred.

As is known, the AMF 606 will respond with a context ack signal 624. Subsequently, as will be appreciated by those skilled in the art, signals 626 continue the mobility registration and session startup for transferrable sessions.

Meanwhile, MME 608 deactivates the sessions that cannot be transferred, e.g., by communicating deactivate signal 630 to the SGW 610. In turn, the SGW 610 will communicate a deactivate signal 632 to the PGW 612. The deactivate signals 630 and 632 will essentially deactivate or terminate any session that cannot be transferred, such as sessions anchored in GGSN. Such termination allows the UE 602 to begin reestablishing those sessions as needed on the new platform.

Last the AMF 606 communicates an acceptance of the registration at 434 indicating the active sessions and PDU session status, which is also then communicated at 636 to the UE 602 by the gNB 604.

Figure 7:
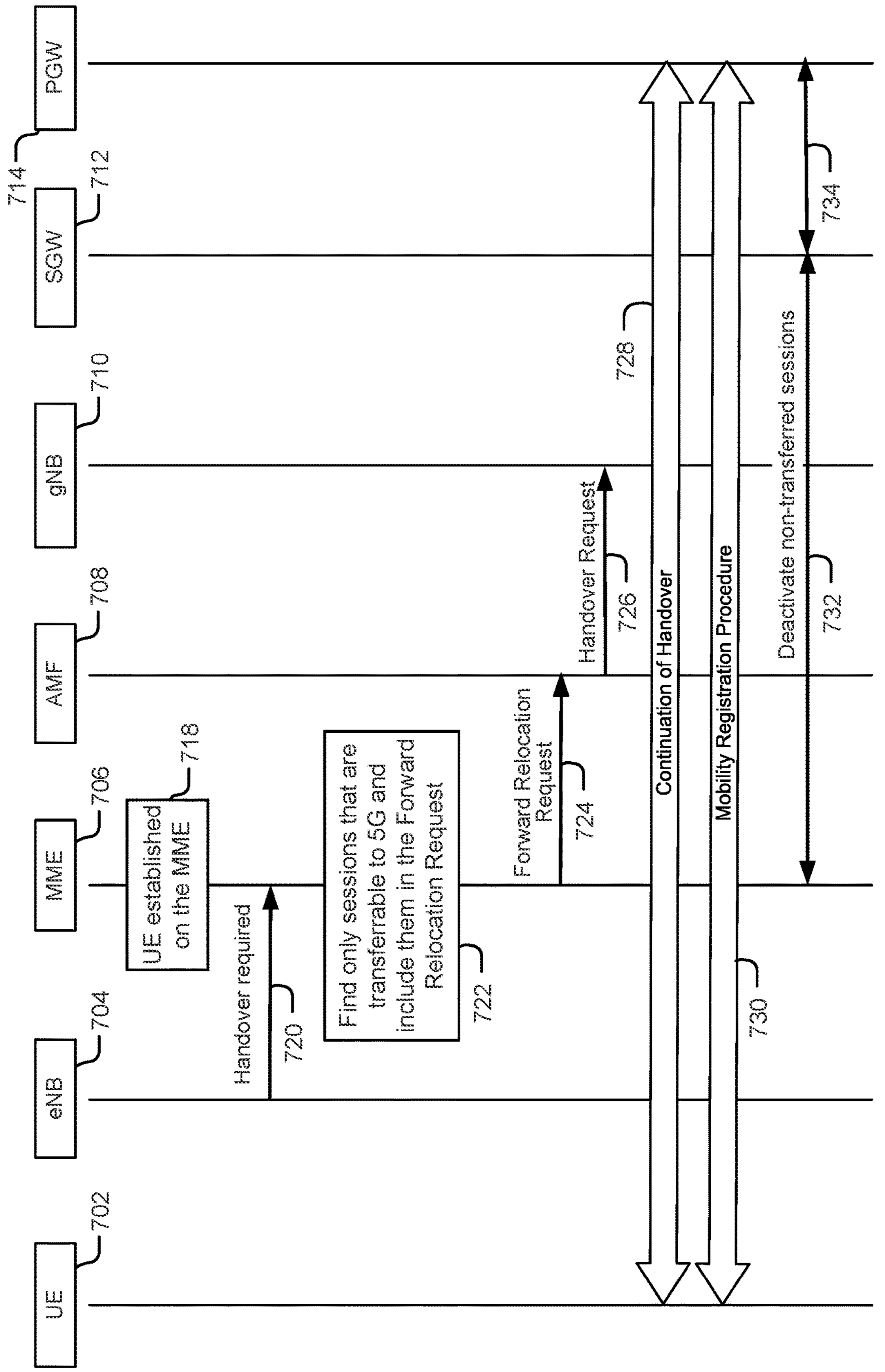
FIG. 7 illustrates timing diagram showing the transfer scenario from 4G to 5G in the connected mode in accordance with various aspects described herein.

FIG. 7 illustrates a timing diagram as a UE 702 moves from one location, essentially connected to a 4G platform, to another location and needs to transfer to 5G platform in the connected mode. In connected mode, as discussed above, the UE 702 is actively using the network for data and/or voices services and is exchanging data with the network. As will be appreciated by those skilled in the art, the UE 702, in connected mode, may communicate through an eNB 704 to an MME 706. As discussed above, the MME 706 may communicate with an AMF 708, which then communicates with a gNB 710, which can then communicate with the SGW 712 and the PGW 714.

Initially, the UE 702 is established/registered on the MME 706, as indicated by box 718, such that the MME 706 may control the mobility of the UE 702 and the transfer of connectivity between networks. Upon movement of the UE 702, a handover signal 720 is communicated from the eNB 704 to the MME 706. Such a handover signal 720 is known and relates to the eNB 704 sensing movement of the UE 702 such that a handoff or handover is requested. Next, a forward relocation request is generated by the MME 706. However, prior to forwarding the relocation request, the MME 706 evaluates the existing sessions for the UE 702 and identifies those sessions that are transferrable to a 5G platform as indicated by box 722. Identifying these sessions as transferrable may, in embodiments, relate to the method steps described above in conjunction with FIG. 2 or discussed above in conjunction with FIGS. 3, 4, 5 and 6.

Next, the MME 706 forwards the relocation request signal 724 to the AMF 708 which forwards the handover request 726 to the gNB 710. The signals 724 and 726 will include identification information for those sessions that can be transferred. Such signals may not include session information for those that will not be transferred.

Next, as will be appreciated by those skilled in the art, signals 728 and 730 will continue the handoff or handover 728 and will continue to complete the mobility registration procedure 730.

Next, MME 706 deactivates the sessions that cannot be transferred, e.g., by communicating deactivate signal 732 to the SGW 712. In turn, the SGW 712 will communicate a deactivate signal 734 to the PGW 714. The deactivate signals 732 and 734 will essentially deactivate or terminate any session that cannot be transferred, such as sessions anchored in GGSN. Such termination allows the UE 702 to begin reestablishing those sessions as needed on the new platform.

A number of benefits are provided by the system and method in accordance with various aspects described herein. For instance, users may move from network to network more seamlessly since devices will more quickly recognize the deactivation of some sessions, causing the reestablishment procedure to occur sooner, reducing timeout failures and the like. Not only will less time be lost, but the risk of losing data will also be a benefit.

Figure 8:
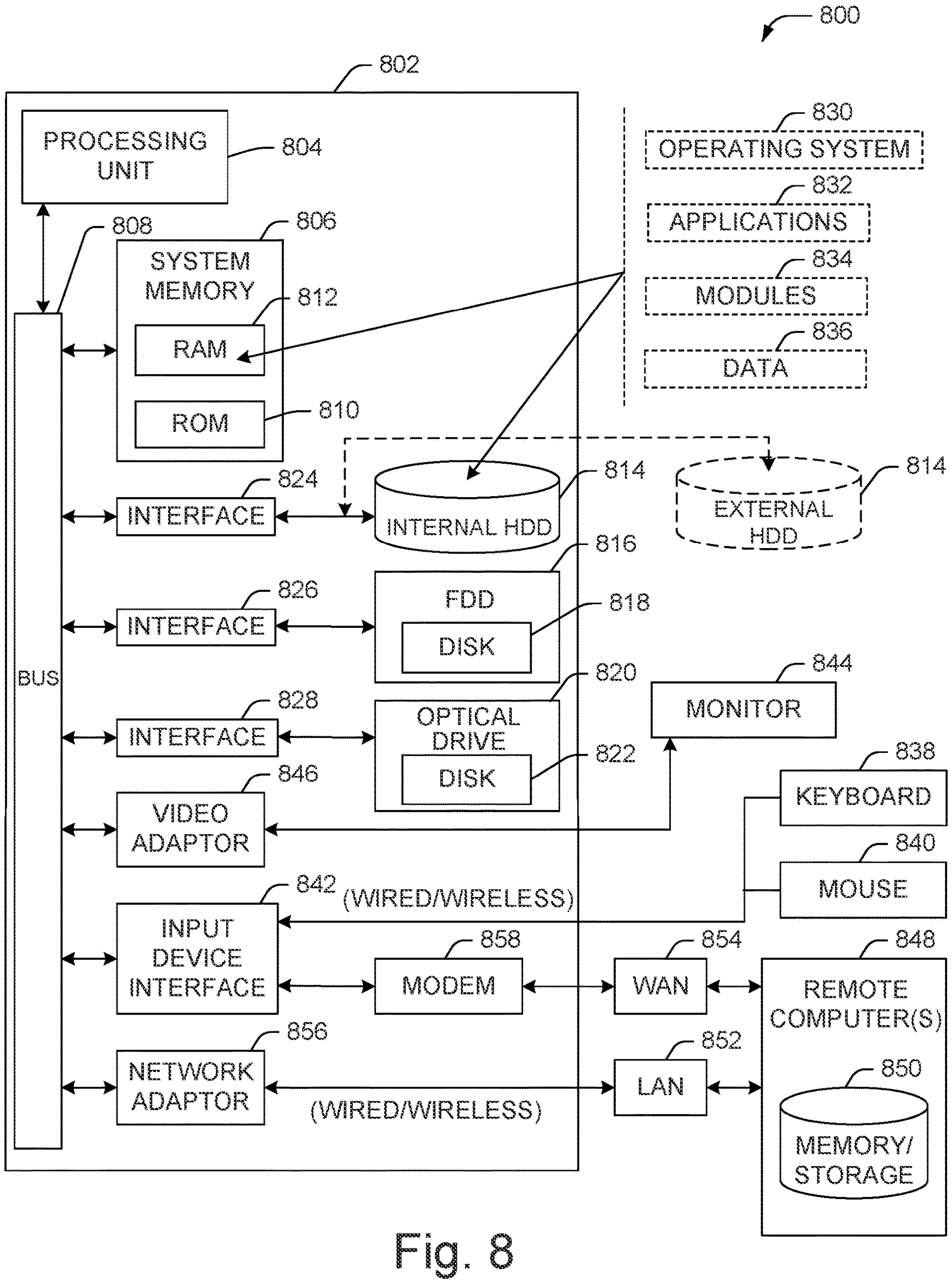
FIG. 8 is a block diagram of an exemplary, non-limiting embodiment of a computing environment in accordance with various aspects described herein.

FIG. 8 illustrates a block diagram of a computing environment in accordance with various aspects described herein. In order to provide additional context for various embodiments of the embodiments described herein, FIG. 8 and the following discussion are intended to provide a brief, general description of a suitable computing environment 800 in which the various embodiments of the subject disclosure can be implemented. In particular, computing environment

800 can be used in the implementation of such as MMEs, UE, and the like. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

As will be appreciated, the embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 8, the example environment can comprise a computer 802, the computer 802 comprising a processing unit 804, a system memory 806 and a system bus 808. The system bus 808 couples system components including, but not limited to, the system memory 806 to the processing unit 804. The processing unit 804 can be any of various commercially available processors. Dual microprocessors and other multiprocessor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 comprises ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also comprise a high-speed RAM such as static RAM for caching data.

The computer 802 further may further comprise an internal hard disk drive (HDD) 814 (e.g., EIDE, SATA), which internal HDD 814 can also be configured for external use in a suitable chassis (not shown), and/or a magnetic floppy disk drive (FDD) 816, (e.g., to read from or write to a removable diskette 818) and/or an optical disk drive 820, (e.g., reading a CD-ROM disk 822 or, to read from or write to other high capacity optical media such as the DVD). The HDD 814, magnetic FDD 816 and optical disk drive 820 can be connected to the system bus 808 by a hard disk drive interface 824, a magnetic disk drive interface 826 and an optical drive interface 828, respectively. The hard disk drive interface 824 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 812, comprising an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

A user can enter commands and information into the computer 802 through one or more wired/wireless input devices, e.g., a keyboard 838 and a pointing device, such as a mouse 840. Other input devices (not shown) can comprise a microphone, an infrared (IR) remote control, a joystick, a game pad, a stylus pen, touch screen or the like. These and other input devices are often connected to the processing unit 804 through an input device interface 842 that can be coupled to the system bus 808, but can be connected by other interfaces, such as a parallel port, an IEEE 1394 serial port, a game port, a universal serial bus (USB) port, an IR interface, etc.

A monitor 844 or other type of display device can be also connected to the system bus 808 via an interface, such as a video adapter 846. It will also be appreciated that in alternative embodiments, a monitor 844 can also be any display device (e.g., another computer having a display, a smart phone, a tablet computer, etc.) for receiving display information associated with computer 802 via any communication means, including via the Internet and cloud-based networks. In addition to the monitor 844, a computer typically comprises other peripheral output devices (not shown), such as speakers, printers, etc.

The computer 802 can operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically comprises many or all of the elements described relative to the computer 802, although, for purposes of brevity, only a remote memory/storage device 850 is illustrated. The logical connections depicted comprise wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the LAN 852 through a wired and/or wireless communication network interface or adapter 856. The adapter 856 can facilitate wired or wireless communication to the LAN 852, which can also comprise a wireless AP disposed thereon for communicating with the adapter 856.

When used in a WAN networking environment, the computer 802 can comprise a modem 858 or can be connected to a communications server on the WAN 854 or has other means for establishing communications over the WAN 854, such as by way of the Internet. The modem 858, which can be internal or external and a wired or wireless device, can be connected to the system bus 808 via the input device interface 842. In a networked environment, program modules depicted relative to the computer 802 or portions thereof, can be stored in the remote memory/storage device 850. It will be appreciated that the network connections shown are example and other means of establishing a communications link between the computers can be used.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 9:
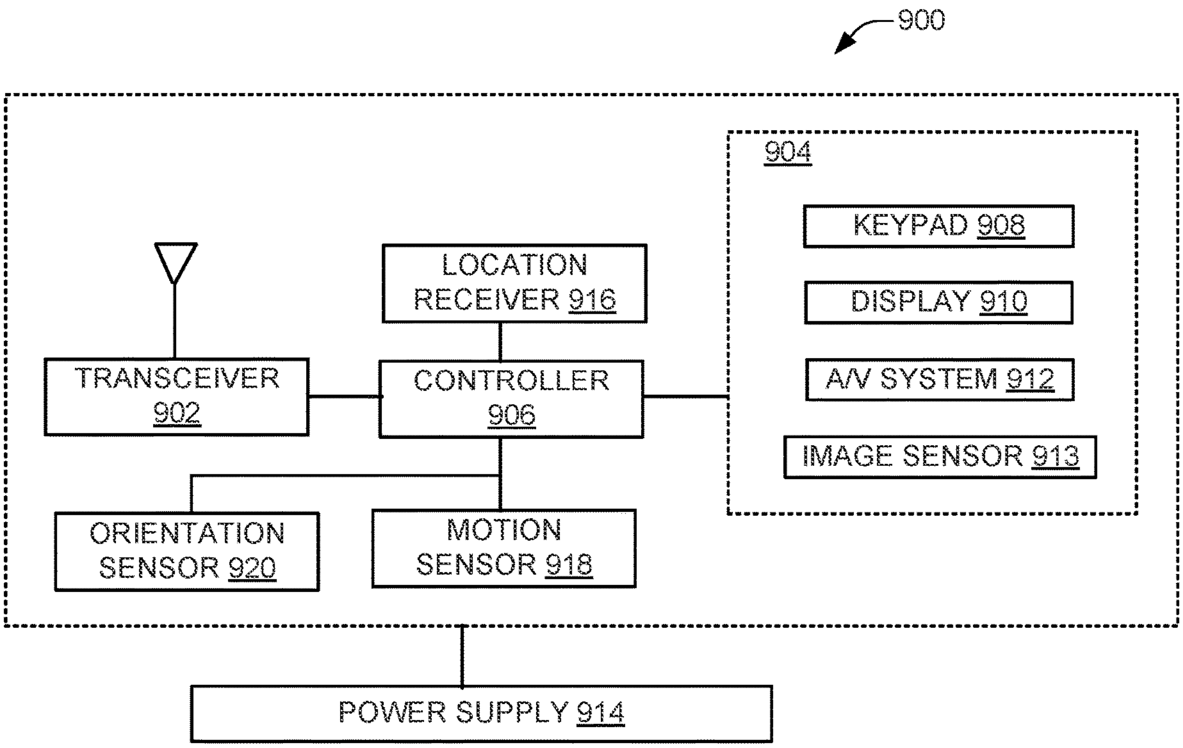
FIG. 9 is a block diagram of an exemplary, non-limiting embodiment of a communication device in accordance with various aspects described herein.

Turning now to FIG. 9 an illustrative embodiment of a communication device 900 is shown. The communication device 900 can serve as an illustrative embodiment of devices such as user computer device 102 as well as other devices. For example, communication device 900 can operate as a UE as described herein.

The communication device 900 can comprise a wireline and/or wireless transceiver 902 (herein transceiver 1002), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, WiFi, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VOIP, etc.), and combinations thereof.

The UI 904 can include a depressible or touch-sensitive keypad or touchscreen 908 for manipulating operations of the communication device 1000. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 which is any suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface having graphical user interface (GUI) elements that can be selected by a user with a touch of a finger. The display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high-volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable communications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A computing system performing mobility management entity functions, the computing system comprising:

a processing system including a processor; and a memory that stores executable instructions that, when executed by the processing system, facilitate performance of operations, the operations comprising:

receiving an indication to transfer one or more sessions of a user equipment from a first platform to a second platform, wherein the first platform and the second platform respectively represent distinct network standard technologies;

based on classifying the one or more sessions of the user equipment, identifying transferable and non-transferable sessions of the one or more sessions, wherein classifying the one or more sessions comprises:

performing a name authority pointer query against a canonical node name of a gateway for each of the one or more sessions to retrieve a service parameter of the gateway;

evaluating each service parameter to determine whether the corresponding session is anchored in the second platform; and in response to determining the corresponding session is not anchored in the second platform, marking the corresponding session as non-transferable to the second platform;

sending a response signal indicating transferable sessions; and deactivating the non-transferable sessions.

2. The computing system as defined in claim 1, the operations further comprising:

transferring transferable sessions to the second platform.

3. The computing system as defined in claim 2 wherein the deactivating of non-transferable sessions occurs substantially simultaneously with the transferring of transferable sessions.

4. The computing system as defined in claim 1 wherein the first platform operates on 4G technology and the second platform operates on 2G or 3G technology.

5. The computing system as defined in claim 1 wherein the first platform operates on 4G technology and the second platform operates on 5G technology.

6. The computing system as defined in claim 1 wherein a first service parameter of a first gateway for the one or more sessions indicates at least one of the one or more sessions is anchored on a Gateway General Packet Radio Service Support Node.

7. The computing system as defined in claim 1 wherein a first service parameter of a first gateway for the one or more sessions indicates at least one of the one or more sessions is anchored using a Session Management Function.

8. A method of transferring sessions of a user equipment comprising:

receiving an indication to transfer one or more sessions of the user equipment from a first platform to a second platform, wherein the first platform and the second platform respectively represent distinct network standard technologies;

based on classifying the one or more sessions of the user equipment, identifying transferable and non-transferable sessions of the one or more sessions, wherein classifying the one or more sessions comprises:

performing a name authority pointer query against a canonical node name of a gateway for each of the one or more sessions to retrieve a service parameter of the gateway;

evaluating each service parameter to determine whether the corresponding session is anchored in the second platform; and in response to determining the corresponding session is not anchored in the second platform, marking the corresponding session as non-transferable to the second platform;

sending a response signal indicating transferable sessions; and deactivating the non-transferable sessions.

9. The method as defined in claim 8, further comprising:

transferring transferable sessions to the second platform.

10. The method as defined in claim 9 wherein the deactivating of non-transferable sessions occurs substantially simultaneously with the transferring of transferable sessions.

11. The method as defined in claim 8 wherein the first platform operates on 4G technology and the second platform operates on 2G or 3G technology.

12. The method as defined in claim 8 wherein the first platform operates on 4G technology and the second platform operates on 5G technology.

13. The method as defined in claim 8 wherein a first service parameter of a first gateway for the one or more sessions indicates at least one of the one or more sessions is anchored on a Gateway General Packet Radio Service Support Node.

14. The method as defined in claim 8 wherein a first service parameter of a first gateway for the one or more sessions indicates at least one of the one or more sessions is anchored using a Session Management Function.

15. A non-transitory computer-readable medium storing instructions for transferring sessions in conjunction with performing mobility management entity functions, the instructions when executed by one or more processors of a computing device, cause the computing device to perform a method comprising:

receiving an indication to transfer one or more sessions of a user equipment from a first platform to a second platform, wherein the first platform and the second platform respectively represent distinct network standard technologies;

based on classifying the one or more sessions of the user equipment, identifying transferable and non-transferable sessions of the one or more sessions, wherein classifying the one or more sessions comprises:

performing a name authority pointer query against a canonical node name of a gateway for each of the one or more sessions to retrieve a service parameter of the gateway;

evaluating each service parameter to determine whether the corresponding session is anchored in the second platform; and in response to determining the corresponding session is not anchored in the second platform, marking the corresponding session as non-transferable to the second platform;

sending a response signal indicating transferable sessions; and deactivating the non-transferable sessions.

16. The non-transitory computer-readable medium as defined in claim 15 wherein the method further comprises:

transferring transferable sessions to the second platform.

17. The non-transitory computer-readable medium as defined in claim 16 wherein deactivating the non-transferable sessions occurs substantially simultaneously with the transfer of transferable sessions.

18. The non-transitory computer-readable medium as defined in claim 15 wherein the first platform operates on 4G technology and the second platform operates on 2G or 3G technology.

19. The non-transitory computer-readable medium as defined in claim 15 wherein the first platform operates on 4G technology and the second platform operates on 5G technology.

20. The non-transitory computer-readable medium as defined in claim 15 wherein a first service parameter of a first gateway for the one or more sessions indicates at least one of the one or more sessions is anchored on a Gateway General Packet Radio Service Support Node.

* * * * *